United States Patent Office 2,820,809
Patented Jan. 21, 1958

2,820,809

PREPARATION OF HALOETHYL HALOFORMATES

Ludo K. Frevel and Leonard J. Kressley, Midland, Mich., assignors to The Dow Chemical Company, Midland, Mich., a corporation of Delaware No Drawing. Application August 16, 1956
Serial No. 604,307

3 Claims. (Cl. 260—463)

This invention concerns the preparation of haloethyl haloformates. More particularly, it relates to the preparation of haloethyl haloformates by a catalyzed vapor-phase reaction between phosgene or its halogen analogs and ethylene oxide.

The preparation of haloalkyl haloformates by reaction between ethylene chlorohydrin or trimethylene chlorohydrin and phosgene is well known.

In accordance with this invention, it has now been discovered that ethylene oxide can be reacted with phosgene or its halogen analogs such as $COBr_2$, $COBrCl$, $COFCl$, and $COFBr$ in a vapor phase reaction in the presence of a catalytic amount, e. g., between 0.01 and 7 percent of hydrogen halide, ethylene oxide basis, to yield haloethyl haloformates.

The preferred hydrogen halide catalyst is hydrogen chloride although hydrogen bromide and hydrogen iodide can also be used. Alternatively, the hydrogen halide can be formed in situ by introducing an amount of water vapor sufficient to liberate the desired amount of hydrogen halide by hydrolyzing phosgene or its halogen analog.

At least a molar equivalent of phosgene or a halogen analog thereof per mole of ethylene oxide is desirable in order to keep the formation of diadducts and other by-products to a minimum. While larger proportions than 3.5 moles of phosgene per mole of ethylene oxide can be used, there is no advantage to be gained in exceeding a 3.5 to 1 molar proportion of phosgene to alkylene oxide.

The reaction can be carried out at atmospheric, subatmospheric or superatmospheric pressure, but atmospheric pressure is generally preferred.

In practice, phosgene and vaporized ethylene oxide, together with hydrogen halide catalyst are passed through a reactor, advantageously a reactor packed with ceramic Berl saddles or the like maintained at a reaction temperature above the boiling point of ethylene oxide and below its decomposition temperature, generally between 100° and 200° C. Reactor effluent is cooled, e. g., by passing through a water-cooled condenser. Condensed material is then fractionally distilled to recover the product. Elevated temperature reaction is advantageously carried out in the presence of an inert gaseous diluent, e. g., nitrogen, methane, argon and the like, to avoid or minimize ethylene oxide decomposition.

The following examples represent preferred embodiments of this invention, parts and percentages therein being by weight.

Example 1

Phosgene at a rate of 0.9 gram per minute, ethylene oxide vapor at a rate of 0.115 gram per minute and hydrogen chloride at a rate of 0.008 gram per minute were passed through a 0.5 inch diameter glass reactor tube packed with 10 inches of ¼ inch ceramic Berl saddles. The molar proportion of phosgene to ethylene oxide was 3.4 to 1. The center 6 inches of the reactor tube was maintained at 150° C. Effluent vapors leaving the reactor tube were passed through a water-cooled condenser, then through a carbon dioxide cold trap. A total of 55.4 grams of condensate was recovered after a run of 150 minutes. The condensate contained 90 percent of 2-chloroethyl chloroformate, 7 percent of by-product and 3 percent of phosgene, as determined by infra-red analysis. The reaction was continued for an additional 105 minutes as the temperature was gradually descreased to 100° C. An additional amount of condensate weighing 34.4 grams was collected. It contained 90 percent of 2-chloroethyl chloroformate, 8 percent of by-product and 1 percent of phosgene.

Example 2

The same procedure as in Example 1 was repeated except for a beginning reaction temperature of 140° C. and a final reaction temperature of 120° C. for a total period of 425 minutes. A total of 182.4 grams of condensate was collected. The condensates from Examples 1 and 2 were combined and fractionally distilled. There was obtained 189 grams of 2-chloroethyl chloroformate, having a boiling point of 153° C. at atmospheric pressure.

What is claimed is:

1. A process for preparing a 2-haloethyl haloformate which comprises reacting in the vapor phase a mixture of ethylene oxide with at least a molar equivalent of a carbonyl halide of the group consisting of phosgene and its halogen analogs containing no more than one fluoro substituent in the presence of a catalytic amount of at least one hydrogen halide of the group consisting of hydrogen chloride, hydrogen bromide and hydrogen iodide at temperatures between the boiling point and the decomposition temperature of ethylene oxide, condensing liquid reaction products and separating and recovering 2-haloethyl haloformate from the liquid condensate.

2. A process as claimed in claim 1 in which the reaction temperature ranges between 100° and 200° C. and the hydrogen halide catalyst ranges between 0.01 and 7 percent by weight of ethylene oxide.

3. A process as claimed in claim 1 in which phosgene and ethylene oxide are reacted in the presence of a catalytic amount of hydrogen chloride, the molar proportion of phosgene to ethylene oxide is 3.4 to 1, the reaction temperature ranges between 100° and 150° C., and the liquid condensate is fractionally distilled to separate and recover 2-chloroethyl chloroformate.

References Cited in the file of this patent

UNITED STATES PATENTS 2,636,906   Davis _____ Apr. 28, 1953

FOREIGN PATENTS 237,387    Switzerland _____ Aug. 1, 1945
1,010,961  France _____ Apr. 2, 1952

OTHER REFERENCES

Bronsted et al.: Jour. Amer. Chem., vol. 51, p. 428–29 (1929).